(12) United States Patent
Mollmann et al.

(10) Patent No.: US 7,497,662 B2
(45) Date of Patent: Mar. 3, 2009

(54) METHODS AND SYSTEMS FOR ASSEMBLING ROTATABLE MACHINES

(75) Inventors: Daniel E. Mollmann, Cincinnati, OH (US); Thomas R. Henning, Cincinnati, OH (US); David W. Crall, Loveland, OH (US); Matthew A. Oakland, Cincinnati, OH (US); Todd M. Dahling, Loveland, OH (US)

(73) Assignee: General Electric Company, Schenectady, NY (US)

( * ) Notice: Subject to any disclaimer, the term of this patent is extended or adjusted under 35 U.S.C. 154(b) by 449 days.

(21) Appl. No.: 11/461,123

(22) Filed: Jul. 31, 2006

(65) Prior Publication Data

US 2008/0027686 A1    Jan. 31, 2008

(51) Int. Cl.
 *F01D 5/26* (2006.01)
(52) U.S. Cl. .................... 416/144; 416/500; 416/1; 416/219 R
(58) Field of Classification Search .............. 416/1, 416/144, 500, 219 R; 29/889.21; 700/56, 700/114, 279
See application file for complete search history.

(56) References Cited

U.S. PATENT DOCUMENTS

| | | | |
|---|---|---|---|
| 3,771,922 A * | 11/1973 | Tracy | .............. 416/196 R |
| 4,732,532 A | 3/1988 | Schwaller et al. | |
| 5,966,525 A | 10/1999 | Manzi, Jr. et al. | |
| 6,908,285 B2 | 6/2005 | Henning et al. | |
| 7,051,436 B2 | 5/2006 | Berger et al. | |
| 7,287,958 B2 * | 10/2007 | Henning et al. | .............. 416/61 |
| 7,416,389 B2 * | 8/2008 | Henning et al. | .............. 416/61 |

* cited by examiner

*Primary Examiner*—Ninh H Nguyen
(74) *Attorney, Agent, or Firm*—William Scott Andes, Esq.; Armstrong Teasdale LLP

(57) ABSTRACT

A method of ordering blades in a rotatable machine that includes a plurality of blades that extend radially outwardly from a rotor is provided. The method includes receiving at least one geometric parameter measurement of each blade in a row of blades, determining a maximum difference of at least one of the received geometric parameter measurements between adjacent blades in the row of blades, determining a vector sum of at least one of the received geometric parameter measurements, determining a plurality of moment weight vector sums of the rotor, and determining, using a computer, a sequence map of each blade using the maximum difference of the at least one geometric parameter measurement between adjacent blades in the row of blades, the vector sum of the at least one received geometric parameter measurement, and the plurality of moment weight vector sums.

16 Claims, 5 Drawing Sheets

METHODS AND SYSTEMS FOR ASSEMBLING ROTATABLE MACHINES

BACKGROUND OF THE INVENTION

This invention relates generally to gas turbine engines, and more specifically to methods and systems for ordering blades on a rotor of a rotatable machines.

Gas turbines are used in different operating environments, such as, to provide propulsion for aircraft and/or to produce power in both land-based and sea-borne power systems. At least some known gas turbine engines include a core engine having, in serial flow arrangement, a fan assembly and a high pressure compressor that compress airflow entering the engine. A combustor ignites a fuel-air mixture that is then channeled through a turbine nozzle assembly towards high and low pressure turbines. The turbines each include a plurality of rotor blades that extract rotational energy from airflow exiting the combustor.

At least some known turbofan gas turbine engines include a fan assembly that includes a plurality of fan blades extending radially outwardly therefrom. These blades may operate with a relative blade tip Mach number in the transonic regime and may be subject to an operating characteristic called multiple-pure-tone (MPT) noise, sometimes referred to as buzzsaw noise. Buzzsaw noise may occur if at least some blades are oriented differently relative to other blades extending around the circumference of the fan case. Moreover, such noise may occur if blade-to-blade geometry variations exist within the fan and/or if flowfield disturbances are present forward of the fan inlet. Such flowfield disturbances may be caused by any number of factors including, but not limited to drain leakage, panel splice leakage, or other geometric non-uniformities. As a result, variations may exist within the fan assembly in the amplitude (strength) and/or spacing of the shockwaves originating from those portions of the blades that have sonic or supersonic velocities. Specifically, at axial locations close to the fan blades, the noise due to the shock waves is generally at multiples of the fan shaft per revolution frequency, which is the frequency with which one point on the shaft passes any particular fixed point as it rotates.

Shock waves of different strengths based on the flowfield disturbances may propagate at different speeds. Accordingly, as the shock waves travel away from the blades, the noise at a blade passing frequency degenerates into a broad spectrum of lower frequency tones as the shock waves merge with each other. Such tones or buzzsaw noise tend to increase passenger annoyance and reduce passenger comfort, and may also adversely affect community noise levels. However, maintaining close manufacturing tolerances to minimize blade to blade orientation and/or geometry variations may be insufficiently capable of minimizing buzzsaw noise.

BRIEF DESCRIPTION OF THE INVENTION

In one aspect, a method of ordering blades in a set of blades to be mounted in a rotor of a rotatable machine is provided. The method includes receiving at least one geometric parameter measurement of each blade in a row of blades, determining a maximum difference of the at least one received geometric parameter measurement between adjacent blades in the row of blades, determining a vector sum of at least one of the received geometric parameter measurements, determining a plurality of moment weight vector sums of the rotor, and determining, using a computer, a sequence map of the plurality of blades using the maximum difference of the at least one geometric parameter measurement between adjacent blades in the row of blades, the vector sum of the at least one received geometric parameter measurement, and the plurality of moment weight vector sums.

In another aspect, a rotor assembly includes a disk including a plurality of circumferentially-spaced blade root slots defined therein, and a plurality of blades, each blade including a root, a tip, and an airfoil therebetween. Each blade is positioned within a pre-determined slot based on a blade map wherein the blade map is generated by a computer system configured to receive at least one geometric parameter measurement of a plurality of blades in a row of blades, determine a maximum difference of the at least one received geometric parameter measurement between adjacent blades in the row of blades, determine a vector sum of at least one of the received geometric parameter measurements, determine a plurality of moment weight vector sums of the rotor, and determine a sequence map of each blade using the maximum difference of the at least one geometric parameter measurement between adjacent blades in the row of blades, the vector sum of the at least one received geometric parameter measurement, and the plurality of moment weight vector sum.

In another aspect, a computer system includes a software code segment programmed to minimize imbalance in a bladed rotor wherein the code segment is configured to receive at least one geometric parameter measurement of a plurality of blades in a row of blades, determine a maximum difference of the at least one received geometric parameter measurements between adjacent blades in the row of blades, determine a vector sum of at least one of the received geometric parameter measurements, determine a plurality of moment weight vector sums of the rotor, and determine a sequence map of each blade using the maximum difference of the at least one geometric parameter measurement between adjacent blades in the row of blades, the vector sum of the at least one received geometric parameter measurement, and the plurality of moment weight vector sums.

DETAILED DESCRIPTION OF THE INVENTION

Figure 1:
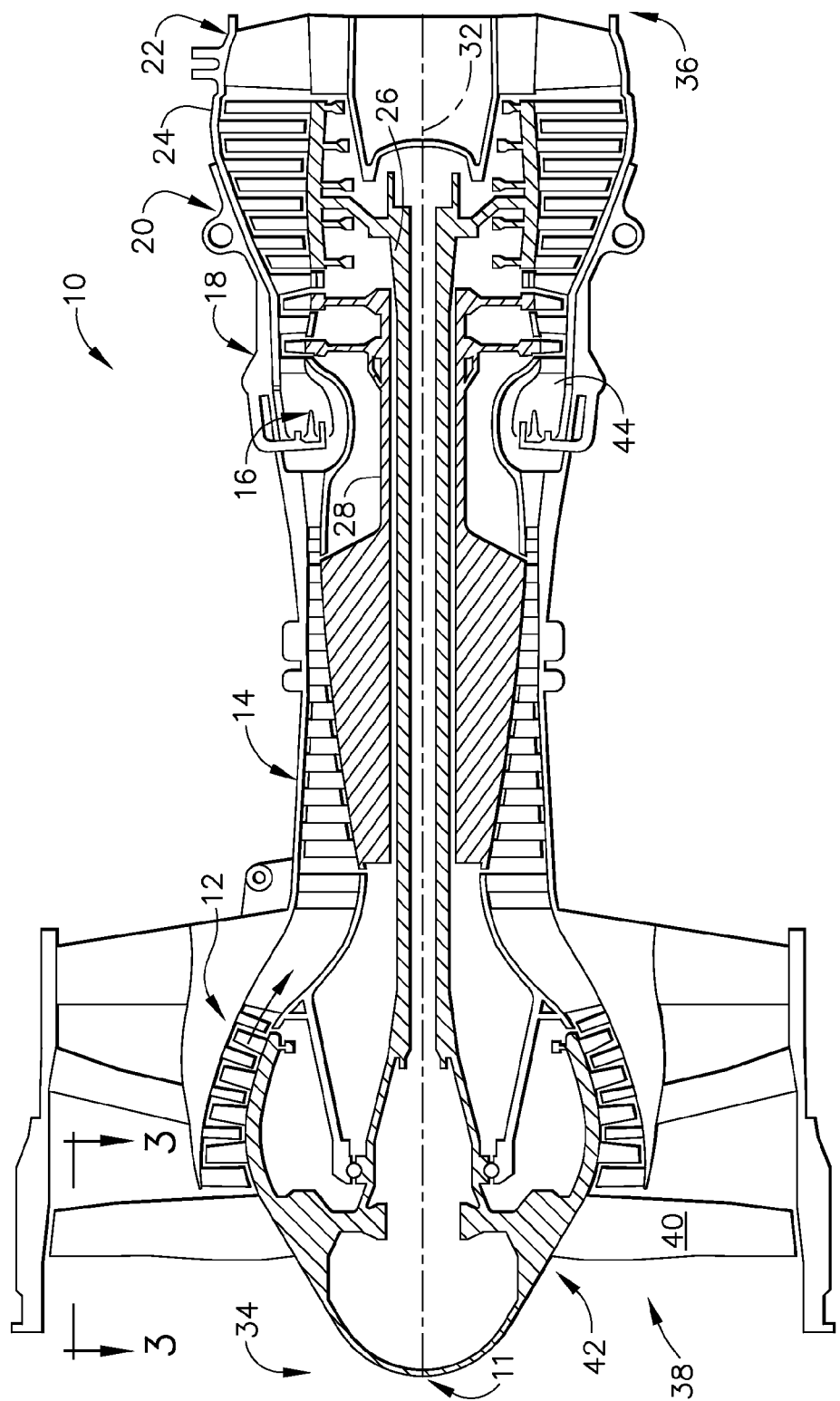
FIG. 1 is a schematic illustration of an exemplary gas turbine engine.

FIG. 1 is a schematic illustration of an exemplary gas turbine engine 10 including a rotor 11 that includes a low-pressure compressor 12, a high-pressure compressor 14, and a combustor 16. Engine 10 also includes a high-pressure turbine 18, a low-pressure turbine 20, an exhaust frame 22 and a casing 24. A first shaft 26 couples low-pressure compressor 12 and low-pressure turbine 20, and a second shaft 28 couples high-pressure compressor 14 and high-pressure turbine 18. Engine 10 has an axis of symmetry 32 extending from an upstream side 34 of engine 10 aft to a downstream side 36 of engine 10. Rotor 11 also includes a fan 38, which includes at least one row of airfoil-shaped fan blades 40 attached to a hub member or disk 42. Blades 40 are substantially identical with respect to each other, except that there are some small differences due to manufacturing tolerances. Blades 40 are coupled to disk 42 in a substantially equi-angularly spaced relationship to each other. In one embodiment, not necessarily illustrated in FIG. 1, gas turbine engine 10 is a GE90 engine commercially available from General Electric Company, Cincinnati, Ohio.

In operation, air flows through low-pressure compressor 12 and compressed air is supplied to high-pressure compressor 14. Highly compressed air is delivered to combustor 16. Combustion gases 44 from combustor 16 propel turbines 18 and 20. High pressure turbine 18 rotates second shaft 28 and high pressure compressor 14, while low pressure turbine 20 rotates first shaft 26 and low pressure compressor 12 about axis 32. During some engine operations, such as during take-off operations and other operating periods when engine power output is relatively high, fan 38 rotates such that a radially outer portion of blades 40 attains supersonic velocity. As a result, the supersonically rotating portions of blades 40 may produce shockwaves, which may generate undesirable noise. The noise may be spread over a broad tonal range, from many multiples of blade passing frequency down to the disk rotational frequency.

Figure 2:
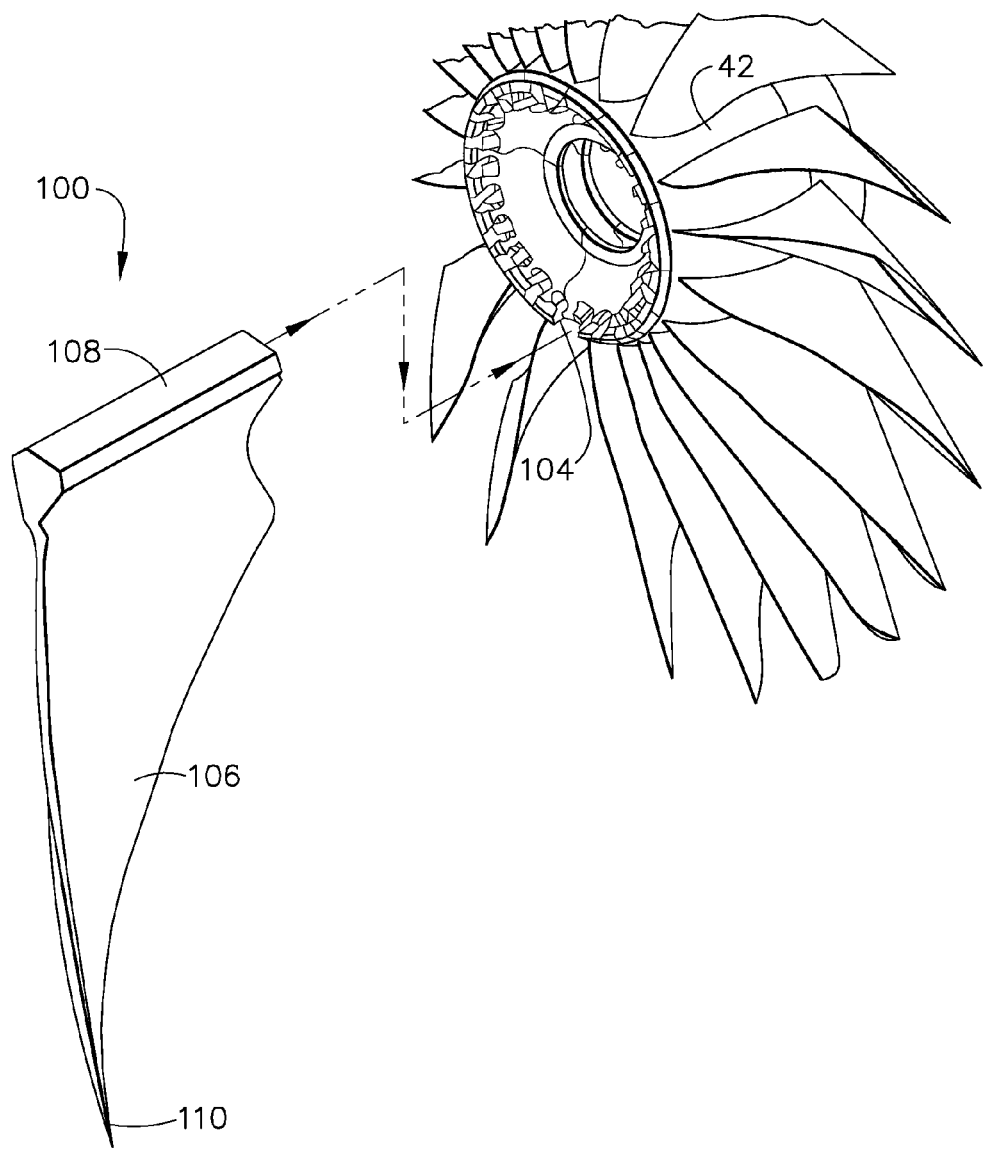
FIG. 2 is an exploded perspective view of an exemplary fan rotor assembly that may be used with, but is not limited to being used with, the gas turbine engine shown in FIG. 1.

FIG. 2 is an exploded perspective view of an exemplary fan rotor assembly 100 that may be used with, but is not limited to being used with, gas turbine engine 10 (shown in FIG. 1). A plurality of circumferentially-spaced blades 40 are supported by rotor disk or drum 42 through a dovetail slot 104. Each blade 40 includes an airfoil 106 that extends between a dovetail root 108 and a blade tip 110 such that each blade 40 is supported through dovetail root 108 and dovetail slot 104 by rotor 42. Blade 40 is representative of the plurality of circumferentially-spaced blades 40 that are each mapped into a specific slot 104 based on measured parameters of blade 40. As used herein, mapping is defined as assigning a specific blade into a specific slot in the rotor using a physical parameter of the blade, or physical parameters of a plurality of blades to determine the assignment. In the exemplary embodiment, each blade 40 includes a composite airfoil 106 that includes a plurality of layered composite plies (not shown). More specifically, each blade 40 includes a first plurality of structural and load carrying airfoil plies in airfoil 106 and a second plurality of root plies in root 108.

Figure 3:
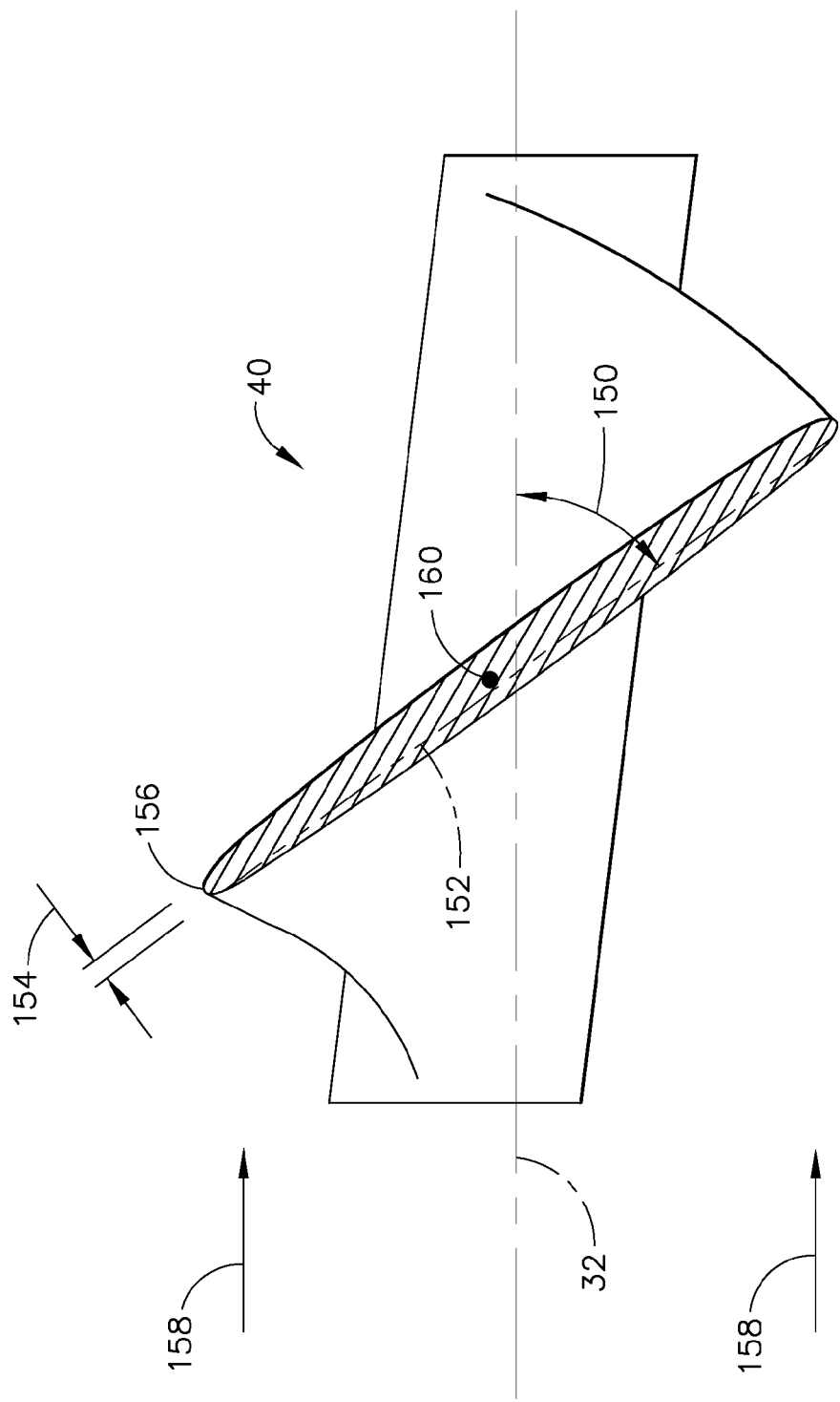
FIG. 3 is a cross-sectional view of an exemplary fan blade taken along line 3-3 shown in FIG. 1.

FIG. 3 is a cross-sectional view of an exemplary fan blade 40 taken along line 3-3 of FIG. 1. Element 150 represents the stagger angle of blade 40 at the cross-section shown. Generally, angle 150 is dependent on a radial distance from axis 32 to the cross-section of interest. In the exemplary embodiment, angle 150 is measured between a chord 152 at the given cross section and fan axis 32. A thickness 154 of blade 40 represents the blade thickness near a leading edge 156 of blade 40. Leading edge 156 is in relation to airflow 158 through fan 38. Each blade 40 includes a radial axis 160.

Factors of blade design that may affect pure multiple tone noise may be, for example, but are not limited to, differences of angle 150 from blade-to-blade, differences of thickness 154 from blade-to-blade, differences in the curvature of the blade airfoil at respective sections from blade-to-blade, and variations of spacing between adjacent blades. By determining a mapping order of the blades into specific slots in the rotor that minimizes variation of the above factors between adjacent blades, multiple pure tones or buzzsaw noise may be reduced.

Figure 4:
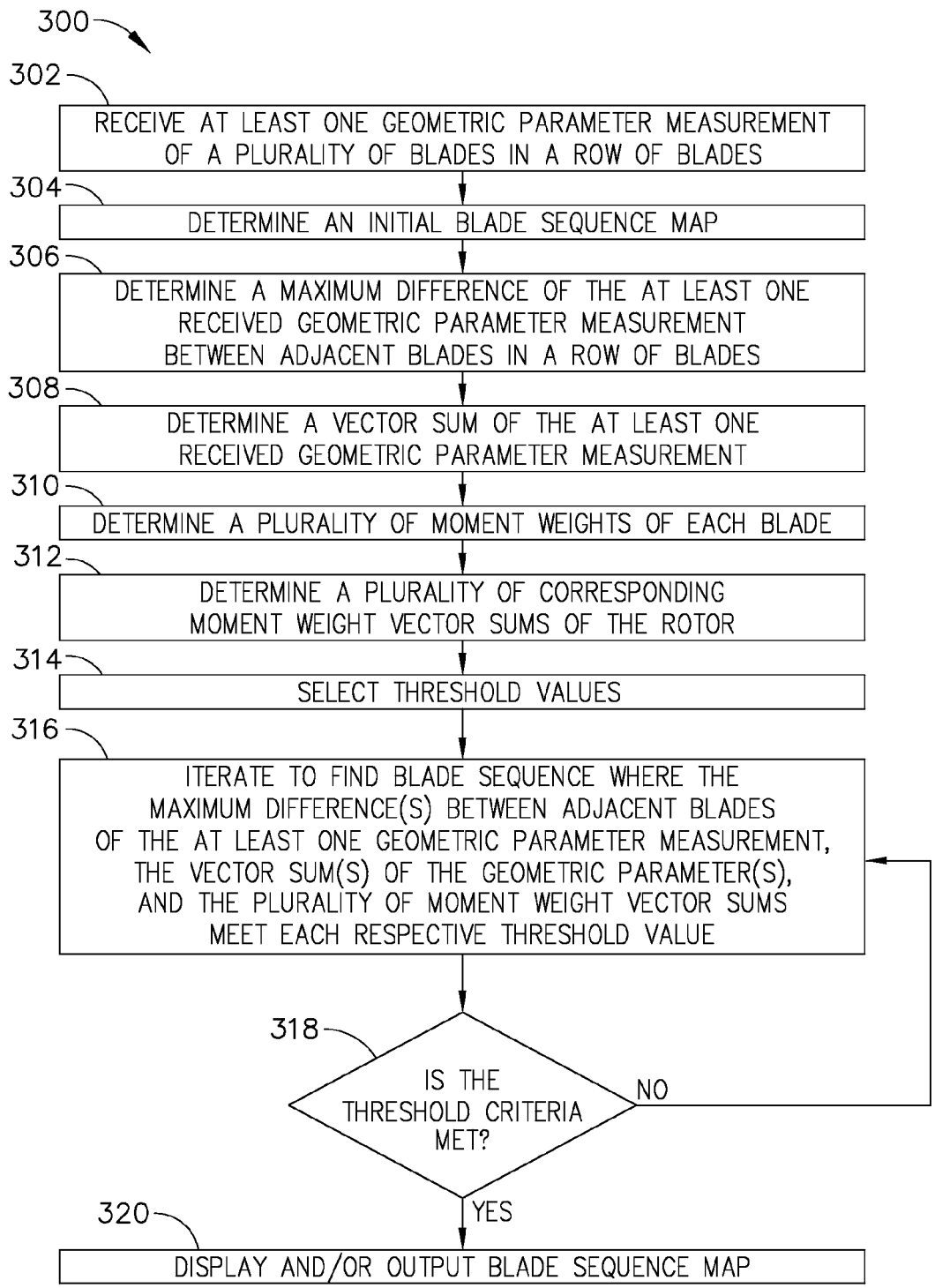
FIG. 4 is a flow diagram of an exemplary embodiment of a method for ordering blades in a rotatable machine, such as, but not limited to, the gas turbine engine shown in FIG. 1.

FIG. 4 is a flow diagram of an exemplary embodiment of a method 300 that may be used for ordering blades in a rotatable machine, such as, but not limited to, gas turbine engine 10 (shown in FIG. 1). In the exemplary embodiment, the machine is a gas turbine engine that includes a rotor, such as, but not limited to, rotor 11 (shown in FIG. 1), that is rotatable about a longitudinal axis of symmetry of the engine.

Method 300 includes receiving 302 at least one geometric parameter measurement of a plurality of blades in a row of blades. The fan blade geometric parameter may be based on a determination by an acoustics specialist and fan aerodynamics specialists relative to a customer specification. The geometric parameter may be any suitable geometric blade parameters, such as, but not limited to, a blade section stagger angle, a blade thickness, a blade chord length, a blade camber, a blade height, a blade tangential position, a blade axial position, and/or a blade radial position. The geometric parameter measurement may be received from a blade manufacturer and/or may be determined after the blade is received at a manufacturing facility. Generally blade to blade variations in geometric parameters associated with the blades contributes to overall circumferential pressure differences of the row of blades, which manifests itself as buzzsaw noise.

The blade section stagger angle may, in some embodiments, be defined as a rotation of at least a portion of a blade about a radial axis through a central region of the blade. The axis of stagger angle may be offset from a center radial axis of the blade, or may be coincident with the center radial axis. Blade thickness may refer to any thickness of the blade, such as, but not limited to, the thickness of the blade leading edge at a predetermined radial distance from the blade tip, the thickness of the blade trailing edge at a predetermined radial distance from the blade tip, the thickness of the blade at a predetermined intermediate point at a predetermined radial distance from the blade tip, the thickness of the blade leading edge at and/or adjacent a portion of the blade root, and/or the thickness of the blade trailing edge at and/or adjacent a portion of the blade root.

The blade tangential position may, in some embodiments, be defined as a displacement of a blade tip or bending of the blade in a circumferential direction in a plane of rotation of the row of blades containing the blade. A blade tangential shift may be used to quantify an amount that a blade is offset from a radial orientation and may also describe a blade that is bowed in the plane of rotation of the row of blades containing the blade.

Prior to positioning blades onto the rotor disk, an initial or starting blade map is determined 304. A blade map may indicate a specific slot for each blade that will be assembled into the rotor and may indicate an order of installation of the blades. The starting position may be a "virtual" position, in that the blades are simulated being installed using a computer model of the rotor and blades. Subsequent iterative maps of blade location may also be virtual maps until a predetermined endpoint is reached during iteration, when a final blade map may be displayed and/or printed.

A maximum difference of one or more of the geometric parameter measurements between adjacent blades in the row of blades may be determined 306 from blade geometry data supplied by the blade manufacturer and/or may be determined by the manufacturing facility after receipt.

For example, a blade section stagger angle difference between adjacent blades may be determined by calculating a ratio of the inlet area to exit area for each set of adjacent blades installed in a starting position around the circumference of the rotor. The inlet area and/or exit area may be determined using a distance between adjacent blades at the same radial distance from the blade tip. Because at least some of the parameters that may be used to determine inlet area and exit area may be fixed, only a line distance may be used to determine ratio of the inlet area and outlet area.

A vector sum of one or more of the geometric parameter measurements for a plurality of blades is also determined 308. For example, a vector sum of the blade section stagger angle of a plurality of blades and/or a vector sum of blade thicknesses of the plurality of blades may be determined. A plurality of moment weights of a plurality of blades in a row of blades may be determined 310. The plurality of moment weights may include, but are not limited to, at least two of a radial moment weight, an axial moment weight, and/or a tangential moment weight. The moment weights may be determined, for example, by horizontally supporting a blade by its root in a device designed to measure moment weight. A moment weight is based not only on a pan weight of the blade, but also is based on a distribution of the weight of the blade along a radial distance extending between the blade root to the blade tip. In a rotating machine, an uneven distribution of moment weight of each blade spaced about the rotor may affect a balance condition of the rotor. Corresponding moment weight vector sums of the rotor may also be determined 312 for each of the moment weights.

Threshold values for the vector sums of the plurality moment weights of all the blades to be positioned on the rotor disk, the vector sum(s) of the geometric parameter measurement(s), and the maximum difference of the geometric parameter measurement(s) between adjacent blades are selected 314. The threshold values may be determined, for example, from an engineering or design requirement contained within a drawing or other technical or administrative document. The initial blade sequence is iteratively remapped 316 to reduce the maximum difference of the geometric parameter measurement(s) between adjacent blades, the vector sums of the plurality of moment weights, and the vector sum(s) of the geometric parameter measurement(s) to values that are less than the respective predetermined values. To determine a mapping order, a computer including a processor and a program code segment configured to select and deselect blades may be utilized. Specifically, when blades are selected, a first blade may be selected for positioning in a specific slot based on the maximum difference of at least one geometric parameter measurement between adjacent blades in a row of blades, the vector sums of the plurality of moment weights, and/or the vector sum(s) of the geometric parameter measurement(s). Blades are iteratively arranged in an order that facilitates minimizing a combination of the vector sums of the plurality of moment weights, and the vector sum(s) of the geometric parameter measurement(s). During the process of minimizing, it may be necessary to completely reorder the selected blades. The computer system may then display the resultant blade map and generate a report detailing the selection process. Additionally, manual entry of blade parameters and recalculation of the blade map are supported. The initial blade map may be random, such that blades are assigned to slots in a random order. In various embodiments, the initial blade map is not random, but the initial blade map is determined based on a parameter that permits less iterations in the remapping process.

When the vector sums of the plurality of moment weights of all the blades to be positioned on the rotor disk, the vector sum(s) of the geometric parameter measurement(s), and the maximum difference of the geometric parameter measurement(s) between adjacent blades are reduced 318 to values that are less than the respective predetermined values, the final blade sequence map may be displayed 320 and/or output.

Figure 5:
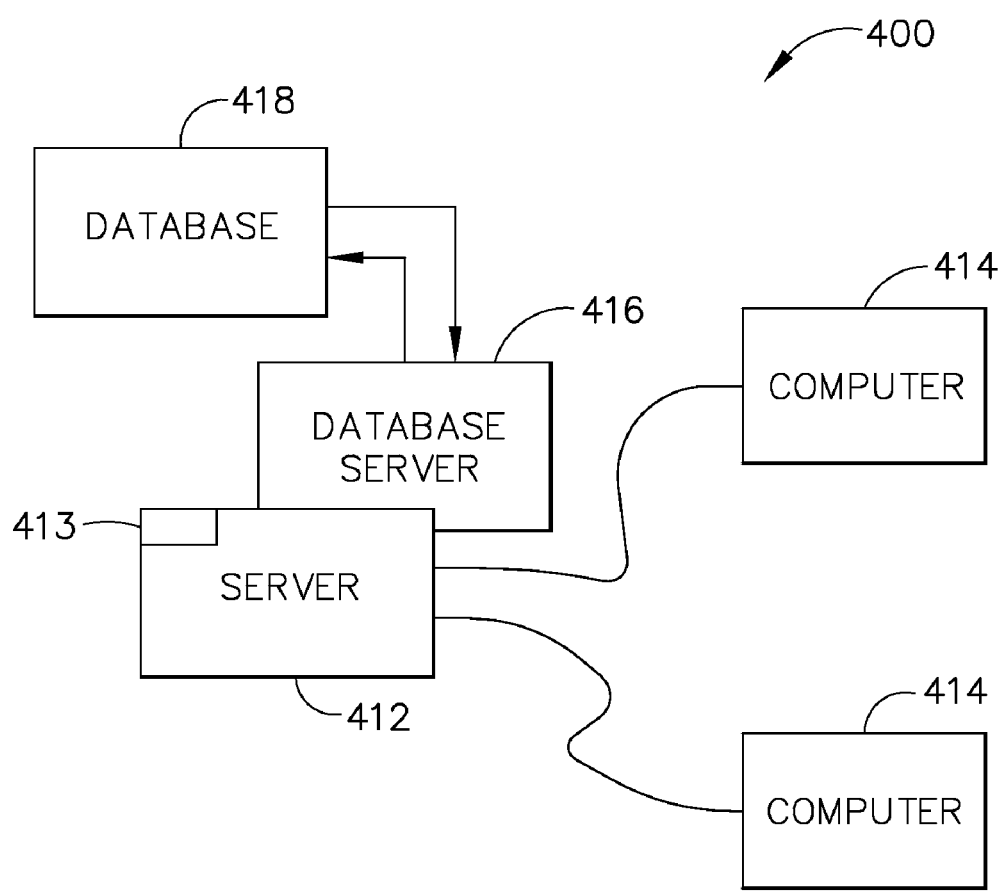
FIG. 5 is a simplified block diagram of an exemplary embodiment of a blade mapping computer system.

FIG. 5 is a simplified block diagram of an exemplary embodiment of a blade mapping computer system 400. As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer." Computer system 400 includes a server system 412 including a disk storage unit 413 for data storage, and a plurality of client sub-systems, also referred to as client systems 414, connected to server system 412. In one embodiment, client systems 414 are computers including a web browser, such that server system 412 is accessible to client systems 414 via the Internet. Client systems 414 are interconnected to the Internet through many interfaces including a network, such as a local area network (LAN) or a wide area network (WAN), dial-in-connections, cable modems and special high-speed ISDN lines. Client systems 414 could be any device capable of interconnecting to the Internet including a web-based phone, personal digital assistant (PDA), or other web-based connectable equipment. A database server 416 is connected to a database 418 containing information regarding engine components. In one embodiment, centralized database 418 is stored on server system 412 and can be accessed by potential users at one of client systems 414 by logging onto server system 412 through one of client systems 414. In an alternative embodiment database 418 is stored remotely from server system 412 and may be non-centralized.

Example embodiments of systems and methods that facilitate reducing multiple pure tone noise in aircraft gas turbine engine fans are described above in detail. A technical effect of the systems and methods described herein includes reducing overall circumferential pressure differences between adjacent blades caused by blade to blade differences in blade geometric parameters that exceed a threshold value such that fan tonal noise is minimized, and therefore reducing aircraft passenger annoyance and community noise levels.

Mapping specific blades into specific rotor slot such that blade to blade variations of a measured and/or a received geometric parameter are reduced facilitates reducing buzzsaw noise that is caused by the pressure oscillations caused by the blade to blade geometric variations between adjacent blades.

The above-described blade mapping system is a cost-effective and highly reliable method and system that may be used for determining a blade map that reduces the corresponding vector sums of a plurality moment weights of all the blades to be positioned on the rotor disk, the vector sum(s) of one or more geometric parameter measurements, and the maximum difference of one or more geometric parameter measurement(s) between adjacent blades to a value that is less than a predetermined threshold. Accordingly, the blade mapping method and system facilitates assembly, operation, and maintenance of machines, and in particular gas turbine engines, in a cost-effective and reliable manner.

Exemplary embodiments of blade mapping method and system components are described above in detail. The components are not limited to the specific embodiments described herein, but rather, components of each system may be utilized independently and separately from other components described herein. Each blade mapping system component can also be used in combination with other blade mapping system components.

While the invention has been described in terms of various specific embodiments, those skilled in the art will recognize that the invention can be practiced with modification within the spirit and scope of the claims.

What is claimed is:

1. A computer-implemented method of ordering blades in a rotatable machine wherein the rotatable machine includes a plurality of blades that extend radially outwardly from a rotor, said method comprising:
   receiving at least one geometric parameter measurement of a plurality of blades in a row of blades;
   determining a maximum difference between adjacent blades in the row of blades of the at least one received geometric parameter measurement;
   determining a vector sum of at the least one received geometric parameter measurement for the plurality of blades;
   determining a plurality of moment weight vector sums of the plurality of blades of the rotor; and
   determining, using a computer, a sequence map of the plurality of blades using the maximum difference of the at least one geometric parameter measurement between adjacent blades in the row of blades, the vector sum of the at least one received geometric parameter measurement, and the plurality of moment weight vector sums.

2. A method in accordance with claim 1 further comprising iteratively remapping the sequence of the blades to facilitate reducing the maximum difference of the at least one geometric parameter measurement between adjacent blades in a row of blades, the vector sum of the at least one received geometric parameter measurement, and the plurality of moment weight vector sums to values that are less than predetermined values.

3. A method in accordance with claim 1 wherein determining a maximum difference between adjacent blades in the row of blades of the at least one received geometric parameter measurement comprises determining a maximum difference of at least one of a blade section stagger angle, a blade thickness, a blade chord length, a blade camber, a blade height, a blade tangential position, a blade axial position, and a blade radial position between the adjacent blades.

4. A method in accordance with claim 1 wherein determining a vector sum of at least one of the received geometric parameter measurements comprises determining a vector sum of at least one of a blade section stagger angle, a blade thickness, a blade chord length, a blade camber, a blade height, a blade tangential position, a blade axial position, and a blade radial position of each blade in the row of blades.

5. A method in accordance with claim 1 wherein determining a plurality of moment weight vector sums of the rotor comprises determining at least two of a radial moment weight vector sum of the rotor, an axial moment weight vector sum of the rotor, and a tangential moment weight of the rotor.

6. A rotor assembly comprising:
   a disk comprising a plurality of circumferentially-spaced blade root slots defined therein; and
   a plurality of blades, each said blade comprising a root, a tip, and an airfoil therebetween, each said blade positioned within a pre-determined slot based on a blade map, said blade map generated by a computer system configured to:
      receive at least one geometric parameter measurement of a plurality of blades in a row of blades;
      determine a maximum difference between adjacent blades in the row of blades of at least one received geometric parameter measurement;
      determine a vector sum of the at least one received geometric parameter measurements;
      determine a plurality of moment weight vector sums of the plurality of blades in the row of blades; and
      determine a sequence map of the plurality of blades using the maximum difference of the at least one geometric parameter measurement between adjacent blades in the row of blades, the vector sum of the at least one received geometric parameter measurement, and the plurality of moment weight vector sums.

7. A rotor assembly in accordance with claim 6 wherein said computer system is further configured to iteratively remap the sequence of the blades to reduce the maximum difference of the at least one geometric parameter measurement between adjacent blades in a row of blades, the vector sum of the at least one received geometric parameter measurement, and the plurality of moment weight vector sums to a value less than a respective predetermined value.

8. A rotor assembly in accordance with claim 6 wherein said plurality of blades are composite fan blades.

9. A rotor assembly in accordance with claim 6 wherein said computer system is further configured to determine a maximum difference of at least one of a blade section stagger angle, a blade thickness, a blade chord length, a blade camber, a blade height, a blade tangential position, a blade axial position, and a blade radial position between the adjacent blades.

10. A rotor assembly in accordance with claim 6 wherein said computer system is further configured to determine a vector sum of at least one of a blade section stagger angle, a blade thickness, a blade chord length, a blade camber, a blade height, a blade tangential position, a blade axial position, and a blade radial position of each blade in the row of blades.

11. A rotor assembly in accordance with claim 6 wherein said computer system is further configured to determine at least two of a radial moment weight vector sum of the rotor, an axial moment weight vector sum of the rotor, and a tangential moment weight of the rotor.

12. A computer system comprising a software code segment programmed to minimize imbalance in a bladed rotor, said code segment configured to:
   receive at least one geometric parameter measurement of a plurality of blades blade in a row of blades;
   determine a maximum difference between adjacent blades in the row of blades of the at least one received geometric parameter measurement;
   determine a vector sum of at least one of the received geometric parameter measurements;
   determine a plurality of moment weight vector sums of the plurality of blades blade in the row of blades; and
   determine a sequence map of the plurality of blades using the maximum difference of the at least one geometric parameter measurement between adjacent blades in the row of blades, the vector sum of the at least one received geometric parameter measurement, and the plurality of moment weight vector sums.

13. A computer system in accordance with claim 12 wherein said software code segment is configured to iteratively remap the sequence of the blades to facilitate reducing the maximum difference of the at least one geometric parameter measurement between adjacent blades in the row of blades, the vector sum of the at least one received geometric parameter measurement, and the plurality of moment weight vector sums to a value less than a predetermined value.

14. A computer system in accordance with claim 12 wherein said software code segment is configured to determine a maximum difference of at least one of a blade section stagger angle, a blade thickness, a blade chord length, a blade camber, a blade height, a blade tangential position, a blade axial position, and a blade radial position between the adjacent blades.

15. A computer system in accordance with claim 12 wherein said software code segment is configured to determine a vector sum of at least one of a blade section stagger angle, a blade thickness, a blade chord length, a blade camber, a blade height, a blade tangential position, a blade axial position, and a blade radial position of each blade in the row of blades.

16. A computer system in accordance with claim 12 wherein said software product code segment is configured to determine at least two of a radial moment weight vector sum of the rotor, an axial moment weight vector sum of the rotor, and a tangential moment weight of the rotor.

* * * * *